United States Patent Office 3,354,146
Patented Nov. 21, 1967

3,354,146
PROCESS FOR THE PRODUCTION OF CYCLO-
PENTANO OMEGA-OENANTHOLACTAM
Albert Schnider and Kaspar Ryffel, Domat-Ems, Grisons,
and Werner Hurschler, Chur, Grisons, Switzerland, as-
signors to Inventa A.G. für Forschung und Patentver-
wertung, Zurich, Switzerland
No Drawing. Filed May 25, 1965, Ser. No. 458,778
9 Claims. (Cl. 260—239.3)

ABSTRACT OF THE DISCLOSURE

A synthesis process for cyclopentano-omega-oenan-
tholactam from cyclodecanol-(6)-one-(1), by dehydration
of the latter, followed by hydrogenation of the product
obtained, and oximation of the resulting cis-trans-2-keto-
bicyclo(5:3:0)-decane isomer mixture. This is subjected
to a Beckmann-type rearrangement whereby isomers of
the end product are obtained. The reaction can be con-
trolled to yield predominantly cis- or trans-oxime by hy-
drogenating in alkaline or acid medium, respectively. The
isomeric oximes can readily be separated so that cis- or
trans-lactam can be obtained.

This invention relates to the manufacture of cyclopen-
tano-omega-oenantholactam and, more particularly, to
such a manufacture using novel starting materials and
catalysts, thereby obtaining the lactam in good yield and,
if desired, in the form of separate isomers.

Cyclopentano-omega-oenantholactam can be polymer-
ized to polyamide-10 (nylon-10) with a cyclic side chain
and may be produced from cyclodecanedione-1,6. This di-
one is condensed intramolecularly by boiling in soda solu-
tion with formation of cyclopenteno-cycloheptenone (4-
keto-bicyclo (5:3:0) decene-9), followed by hydrogena-
tion of the unsaturated ketone with hydrogen and palla-
dium as catalyst to cis-, trans-cyclopentano-cyclohepta-
none (4-keto-bicyclo (5:3:0)-decene), oximation of the
saturated ketone, and Beckmann-type rearrangement to
cis-, trans-2,3- and cis-trans - 6,7 - cyclopentano-omega-
oenantholactam, respectively:

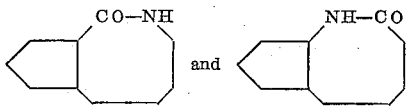

According to the literature, the starting material for
cyclodecanedione-1,6 is trans-9-decalol which can be pro-
duced either according to I. R. Durland and H. Adkins
(JACS 61, 429 (1939)) by ozonisation of decaline or ac-
cording to R. Criegee (B. 77, 22–24 (1944)) by hydro-
genation of trans-decalyl-9-hydroperoxide, obtained in the
decaline oxidation with oxygen. The dehydration of trans-
9-decalol yields 9,10-octaline which can be oxidized with
ozone in approximately 50% yield to cyclodecanedione-
1,6, according to W. Hückel, A. Gerke and A. Gross (B.,
66, 563 (1933)) or A. Plattner and J. Hulstkamp (Helv.,
27, 211 (1944)). This method of producing cyclopentano-
cycloheptanone, the base material for the lactam synthesis,
leads to a mixture of cis- and trans-isomers, is compli-
cated, and the yield obtained thereby is low.

The intermediate product of the above synthesis, cyclo-
penteno-cycloheptenone, can be produced from cyclo-
decanol-(6)-one-(1), according to A. Cope and G.
Holzmann (JACS 72, 3062 (1950)), by oxidation, using
chromium trioxide in acetic acid, or with an aluminum
butylate-benzene-acetone mixture. The yields obtained thereby are small, and the methods uneconomical since
a portion of the oxyketone esterifies with acetic acid, and
the aluminum butylate, when used, must be removed with
acid. Moreover, considerable quantities of solvent must
be distilled.

It now has been found that the synthesis of cyclopen-
tano-omega-oenantholactam can be carried out consider-
ably more easily and with a yield of more than 90 percent
(calculated on cyclodecanol - (6)-one-(1), by obtaining
the cyclopentano-cycloheptanone, starting from cyclo-
decanol-(6)-one-(1), dehydrating in the presence of
specific catalysts and subsequent hydrogenation. The
cyclodecanol - (6)-one-(1) can be produced, e.g., from
decalyl peroxide. The dehydration and the hydrogenation
of the cyclodecanol-(6)-one-(1) both can be carried out
either in liquid or gas phase. Furthermore, the cis-trans-
oxime isomer mixture of cyclopentano-cycloheptanone,
obtained by oximation, can be separated into the pure com-
ponents by fractional crystallization from n-amyl alcohol
and acetone, i.e., pure cis- and pure trans-oxime thus is
obtained, and the corresponding pure cis- or trans-lactams
can be produced therefrom. Recrystallization of the cis-,
trans-cyclopentano-cycloheptanone oxime from alcohol,
however, does not yield pure trans-oxime, and this prob-
ably is the reason why the melting point of the trans-oxime
has been given somewhat too low by W. Hückel and L.
Schnitzspahn (A. 505, 274 (1933)).

It also has been found feasible to produce the bicyclic
saturated ketone in substantially sterically uniform form
by suitable reaction of the 1,6-cyclodecane derivatives
named. The trans-cyclopentano-cycloheptanone can be ob-
tained by dehydration of cyclodecanolone-1,6 followed by
hydrogenation of the bicyclodecenone in carbonate-alka-
line or ammoniacal medium. The yield of trans-ketone is
more than 90%. Hydrogenation of cyclopenteno-cyclo-
cycloheptenone in acid medium yields preponderantly cis-
cyclopentano-cycloheptanone. The cis- and trans-oximes
and the corresponding cis- and trans-lactams obtained by
these methods are identical with the isomeric oximes and
lactams obtained from the oxime isomer mixtures pro-
duced, after neutral hydrogenation, by selective crystal-
lization.

The process according to the invention thus is a manu-
facture of cyclopentano-omega-oenantholactam from
cyclodecanol-(6)-one-(1) which encompasses heating the
starting material in the presence of a suitable dehydra-
tion catalyst; fractionating the reaction mixture thus ob-
tained, whereby the 1,6-oxidocyclodecene-cyclodecenone
mixture, obtained as a first run, is converted with aqueous
acid solution to cyclodecanol-(6)-one-(1) and recycled
into the process; hydrogenating the dehydration product;
oximating the cyclopentano-cycloheptanone occurring in
the form of the cis- or trans-isomer or as an isomer mix-
ture; and rearranging the oxime according to Beckmann
into cyclopentano-omega-oenantholactam, if desired, after
separating the isomers by fractional crystallization.

In the dehydration of cyclodecanol-(6)-one-(1) to
cyclopenteno - cycloheptenone and cyclopentano - cyclo-
heptanone in useful yields, the commonly employed
agents for splitting off water, such as aluminum oxide,
mineral acids, acid salts, etc., are entirely ineffectual.
However, the compounds surprisingly can be manu-
factured by simple distillation, reaction in the gas phase
or in an autoclave in yields above 90 percent when the
catalysts named below are employed. Such dehydration
catalysts are, e.g., alkaline earth- and metal oxides, for
instance, beryllium oxide, calcium oxide, thorium oxide,
zinc oxide and nickel oxide; alkali metal- and alkaline
earth hydroxides, e.g., calcium hydroxide; carbonates
such as alkali metal carbonates and basic zinc carbonate;
alkaline earth- and metal acetates such as calcium acetate, magnesium acetate, lead acetate and zinc acetate; furthermore calcium chloride; amalgamated zinc sheet; mixtures of the salts named, e.g., zinc carbonate plus calcium carbonate and soda lime; also organic aliphatic acids; and phthalic acid.

The dehydration mixture obtained principally consists of cyclopenteno-cycloheptenone (e.g., 90%) and of cis-, trans-cyclopentano-cycloheptanone (e.g., 10%) and can be directly hydrogenated to cis-, trans-cyclopentano-cycloheptanone with hydrogen and palladium as catalyst. However, one can first isolate, e.g., by distillation, the cyclopenteno-cycloheptenone before hydrogenation. Hydrogenation in acid medium yields preponderantly the cis-ketone while in alkaline medium the production of the trans-isomers is favored. According to the dehydration catalyst employed, the saturated bicyclic ketone can prevail over the unsaturated compound. Cyclopentano-cycloheptanone theoretically can occur in 2 cis- and 2 trans-forms. Gas chromatographical analysis has verified the presence of 3 of these 4 isomers. The cis-form can be converted into the trans-form by boiling with sulfuric acid.

Under certain conditions, 1,6-oxidocyclodecene-1 (11-oxabicyclo (1:4:4) undecene-1), a little cyclodecene-5-one-1, and sometimes partially hydrogenated naphthalines are present as by-products after dehydration. The oxido- and cyclodecene compounds can be converted into the starting material with dilute acid and reintroduced into the dehydration process.

The formation of the lactam is carried out by rearrangement of the cyclopentano-cycloheptanone oxime with polyphosphoric acid at 110° C., and a yield of more than 90% is obtained provided care is taken that, after the rearrangement, dilution and neutralization of the viscous acid is effected with good agitation and at a temperature not exceeding 20° C. since otherwise the lactam hydrolyzes. The yield of lactam is not quite as high when the rearrangement is carried out with 80% sulfuric acid. The oxime rearrangement by means of benzenesulfochloride according to Werner and Piquet (A. 586, 30 (1954)) has been found less suitable inasmuch as considerably lower yields are obtained.

When the rearrangement mixture is poured into water, particularly the trans-lactam can be obtained in entirely pure form. However, the most suitable method for the isolation of the lactams formed consists in the extraction of the neutralized solution with benzene-cyclohexane or with chloroform, followed by recrystallization or distillation of the crude lactam extract.

Incompletely rearranged lactam, i.e., lactam which still contains oxime, is identified by the melting point depression. The oximes and lactams produced also can be rendered visible paperchromatographically, by adaptation of the method according to K. Czerepko (Z. f. anal. Ch., 170, 455 (1955)), e.g., with a potassium-bismuth-iodide solution. Because cyclopentano-cycloheptanone oxime and cyclopentano-omega-oenantholactam travel almost at the same speed, oxime spots must be rendered recognizable with ferric chloride. For the aminoacids present in lactam hydrolyzates the ninhydrine reaction is characteristic. Cis- and trans-cyclopentano-omega-aminooenanthic acid can be distinguished thereby solely by differences in the hues of the colors obtained. The rearrangement to the lactam occurs most readily with the trans-oxime with which an almost theoretical yield is feasible; less good is the reaction of the cis-isomer, whereas the rearrangement of the unsaturated oxime appears to be accompanied by side reactions.

The purity of the needle-shaped lactams after crystallization is approximately 100 percent; a complete purification can be attained by recrystallization from amyl alcohol or acetone or by distillation. From the cis-lactam mixture, two further isomers can be isolated by fractional crystallization from acetone so that of the eight theoretically occurring isomers at least four are actually present.

The corrected melting points of the several pure lactams, partly tested chromatographically, are as follows:

(1) cis - trans - cyclopentano - omega - oenantholactam (needles): 117–125° C.
(2) cis - cyclopentano-omega-oenantholactam (needles): 139° C.
(3) trans - c y c l o p e n t a n o - omega - oenantholactam (needles): 156° C.
(4) isomer III (needles): 169° C.
(5) isomer IV (cubes, plates): 158° C.

The boiling point of the cis-trans-lactam mixture is 175–182° C./100 mm. Hg.

Cyclopentano-omega-oenantholactam can be manufactured continuously or batchwise. The refining steps to be employed depend upon the dehydrating catalyst used.

The invention now will be further explained by the following examples. However, it should be understood that these are given merely by way of illustration and not of limitation, and that numerous changes may be made in the details without departing from the spirit and the scope of the invention as hereinafter claimed. The temperatures named in these examples are in degrees centigrade.

Example 1

100 g. cyclodecanol-(6)-one-(1) (M.P. 70° C.) were distilled with addition of 50 g. powdered zinc oxide at a bath temperature of 290° C. At a yield of approximately 80% a distillate was obtained, consisting of 90% cyclopenteno-cycloheptenone and 10% cis, trans-cyclopentano-cycloheptanone, and was hydrogenated at room temperature with hydrogen at 10 atmospheres in the presence of palladium in an autoclave. The cis-, transcyclopentano-cyclopentanone thus obtained (approximately 70 g.) was distilled at 108°/12 mm. Hg, and then dissolved in ethanol and mixed with 35 g. hydroxylamine chlorohydrate. This mixture then was refluxed and slowly neutralized with alcoholic KOH, using bromine-phenol blue as an indicator. The potassium chloride formed was filtered, the alcohol distilled, and the crude oxime obtained recrystallized from ethanol. 65 g. (approximately 85% of the theory) of cis-, trans-cyclopentano-cycloheptanone oxime thus were obtained having a melting point of 112–115° and a boiling point of 148–150°/10 mm. Hg.

The crude oxime can be subjected to fractional crystallization from n-amyl alcohol for the isolation of the trans-isomer and from acetone for isolating the cis-oxime, whereby pure cis-oxime having a melting point of 119° and pure trans-oxime having a melting point of 143° are obtained.

50 g. of the refined oxime isomer mixture obtained were mixed with 110 g. polyphosphoric acid (containing 80–85% $P_2O_5$), heated within 20 minutes to 110° with agitation, and then poured into 1 liter water of 15°. The aqueous reaction mixture was neutralized with 2 n-NaOH (aqueous) or else with ammonia, then extracted with benzene-cyclohexane (1:1). By distillation, 45 g. pure cis-, trans-cyclopentano-omega-oenantholactam were isolated from the extract. The lactam had a melting point of 117–125° and a boiling point of 175–182°/12 mm. The yield was approximately 90 percent.

Example 2

60 g. cyclodecanol-(6)-one-(1) of a melting point of 69° were heated in a stainless steel autoclave ($V_4A$ steel) at 280–300° for 30 minutes with 60 g. granulated basic zinc carbonate (produced from a commercial basic zinc carbonate powder). The reaction mixture then was distilled, the pressure reduced to atmospheric, the catalyst separated, and the remaining mixture subjected to fractionation. At a pressure of 15 mm. Hg, a first run of approximately 5 g. partially hydrogenated naphthalines distilled, followed at 113–116° by a fraction of 4.8 g.

cis-, trans-cyclopentano-cycloheptanone, and at 127–130° by a fraction of 30 g. cyclopenteno-cycloheptenone. The residue was approximately 10 g. unreacted oxyketone. The cis-, trans-cyclopentano-cycloheptanone was converted to cis-, trans-cyclopentano-omega-oenantholactam, as described in Example 1.

The unsaturated bicyclic ketone obtained was hydrogenated in alcoholic solution, containing 2–5% ammonia, at a hydrogen pressure of substantially 10 atmospheres, at room temperature, and in the presence of activated carbon charged with 10 percent palladium, whereby preponderantly trans-cyclopentano-cycloheptanone was obtained. Refining and conversion of the ketone to trans-cyclopentano-cycloheptanone oxime were carried out as in Example 1 and yielded 34 g. in needle shape, M.P. 143°, from alcohol. The recrystallized trans-oxime then was dissolved in twice its weight 80% sulfuric acid with steady agitation, the solution heated to 110° and held at this temperature for 20 minutes. The rearrangement mixture then was poured while cooling into 350 ml. 10% ammonia (aqueous), and the trans-lactam, which had precipitated to its major extent, extracted with chloroform. The quantity of transcyclopentano-omega-oenantholactam isolated by distillation was substantially 30 g. (88% yield) and had a melting point of 156°.

If, under otherwise equal conditions, the unsaturated ketone is hydrogenated in acidic or neutral solution, the cis-lactam preponderantly is obtained, having a melting point of 139°. The rearrangement of the oxime in this instance is carried out at slightly lower temperatures, i.e., at 100–105°. The stronger discoloration occurring thereby can be removed by means of activated carbon or by washing of the solid product with acetone.

Example 3

15 g. cyclodecanol-(6)-one-(1), recrystallized from diisopropylether and having a melting point of 71°, were distilled through a glass tube of 40 cm. length and 2 cm. inside diameter, filled with granulated calcium chloride and having an inside temperature of 470°, at a throughput of 2 ml. per minute. The distillate weighed 10 g. and contained, aside from traces of unreacted oxyketone, substantially 85% cis-, trans-cyclopentano-cycloheptanone and 15% 1,6-oxidocyclodecene-1. The latter was separated by fractionation at 12 mm. Hg at 92° as first run, then hydrated at 20° with agitation with 65% phosphoric acid to cyclodecanol-(6)-one-(1) and recycled into the process. The main product of the fractionation was cis-, trans-cyclopenteno-cycloheptenone and was separated at 108° from hydroxyketone present (B.P. 160°) and converted, as described in Example 1, to cis-, trans-cyclopentano-cycloheptanone oxime and then to cis-, trans-cyclopentano-omega-oenantholactam.

In lieu of the catalysts specifically named in the preceding examples, the dehydration catalysts enumerated in col. 2, lines 67–72, through col. 3, lines 1–5, of this specification can be employed with equally good results.

We claim as our invention:

1. A process for the manufacture of cyclopentano-omega-oenantholactam which comprises dehydrating cyclodecanol-(6)-one-(1); hydrogenating the product thus obtained; oximating the resulting cis-trans 2-keto-bicyclo (5:3:0)-decane isomer mixture; and subjecting the isomer oxime mixture to a Beckmann-type rearrangement to yield cyclopentano-omega-oenantholactam consisting of the isomers 2,3-cis-cyclopentano-omega-oenantholactam, 2,3-trans-cyclopentano-omega-oenantholactam, 6,7 - trans-cyclopentano-omega-oenantholactam and 6,7-cis-cyclopentano-omega-oenantholactam.

2. The process as defined in claim 1, wherein said isomer oxime mixture is separated into cis- and trans-isomers prior to said rearrangement.

3. The process as defined in claim 2, wherein said separation is carried out by recrystallization from acetone and n-amyl alcohol to obtain the trans-oxime.

4. The process as defined in claim 3, wherein the cis-oxime is converted to the trans-oxime by boiling in sulfuric acid.

5. The process as defined in claim 1, wherein the dehydration product is fractionated; the first run consisting of a 1,6-oxidocyclodecene-cyclodecenone mixture converted with aqueous acid to cyclodecanol-(6)-one-(1); and recycled into the process.

6. A process for the manufacture of cyclopentano-omega-oenantholactam which comprises dehydrating cyclodecanol(6)-one-(1) in the presence of a catalyst selected from the group consisting of beryllium oxide, calcium oxide, thorium oxide, zinc oxide, nickel oxide, alkali metal and alkaline earth hydroxides, alkali carbonate, basic zinc carbonate, calcium-, magnesium-, lead and zinc acetate, calcium chloride, mixtures of the salts named, amalgamated zinc sheet, aliphatic organic acids and phthalic acid; hydrogenating the product thus obtained with hydrogen using a palladium catalyst; oximating the resulting cis-trans-2-ketobicyclo-(5:3:0)-decane isomer mixture; and subjecting the isomer oxime mixture to a Beckmann-type rearrangement to yield cyclopentano-omega-oenantholactam consisting of the isomers 2,3-cis-cyclopentano-omega-oenantholactam, 2,3-trans-cyclopentano-omega-oenantholactam, 6,7-cis- and 6,7-trans-cyclopentano-omega-oenantholactam.

7. The process as defined in claim 6, wherein the hydrogenation is carried out in alkaline medium thereby obtaining predominantly the cis-isomer.

8. The process as defined in claim 6, wherein the hydrogenation is carried out in acid medium, thereby obtaining predominantly the trans-isomer.

9. The process as defined in claim 6, wherein dehydration is carried out at temperatures of substantially 280 to 470° C.

References Cited

FOREIGN PATENTS 915,086  6/1954  Germany.
899,687  6/1962  Great Britain.

OTHER REFERENCES

Goering et al.: "J.A.C.S.," vol. 78, pp. 5371–4 (1956).

WALTER A. MODANCE, *Primary Examiner.*

J. BOND, *Assistant Examiner.*